(12) United States Patent
Rastegar et al.

(10) Patent No.: US 7,905,678 B2
(45) Date of Patent: Mar. 15, 2011

(54) DEPLOYABLE COLLAPSIBLE ENGINEERED MATERIAL SYSTEMS FOR RUNWAY SAFETY

(75) Inventors: Jahangir S. Rastegar, Stony Brook, NY (US); Thomas Spinelli, East Northport, NY (US)

(73) Assignee: Omnitek Partners, LLC, Ronkonkoma, NY (US)

( * ) Notice: Subject to any disclaimer, the term of this patent is extended or adjusted under 35 U.S.C. 154(b) by 613 days.

(21) Appl. No.: 11/980,285

(22) Filed: Oct. 30, 2007

(65) Prior Publication Data

US 2009/0110481 A1  Apr. 30, 2009

(51) Int. Cl.
*B64F 1/02* (2006.01)
(52) U.S. Cl. ......... 404/10; 404/71; 244/110 E; 188/371
(58) Field of Classification Search ............ 404/10, 404/17, 71; 290/110 R; 188/371; 244/110 R, 244/110 E, 114 R
See application file for complete search history.

(56) References Cited

U.S. PATENT DOCUMENTS

| | | | | |
|---|---|---|---|---|
| 1,916,873 A | * | 7/1933 | Wiggins | 185/39 |
| 4,250,395 A | * | 2/1981 | Lundgren | 290/1 R |
| 5,634,774 A | * | 6/1997 | Angel et al. | 417/229 |
| 6,204,568 B1 | * | 3/2001 | Runner | 290/1 R |
| 6,969,213 B2 | * | 11/2005 | Rastegar et al. | 404/11 |
| 7,429,145 B2 | * | 9/2008 | Rastegar et al. | 404/71 |
| 7,530,760 B2 | * | 5/2009 | Rastegar et al. | 404/10 |
| 7,611,305 B2 | * | 11/2009 | Rastegar et al. | 404/6 |
| 7,717,043 B2 | * | 5/2010 | Rastegar et al. | 104/26.2 |
| 7,744,303 B2 | * | 6/2010 | Rastegar et al. | 404/10 |
| 2006/0029468 A1 | * | 2/2006 | Rastegar et al. | 404/71 |
| 2007/0199268 A1 | * | 8/2007 | Rastegar et al. | 52/403.1 |
| 2007/0200008 A1 | * | 8/2007 | Rastegar et al. | 239/201 |
| 2007/0201947 A1 | * | 8/2007 | Rastegar et al. | 404/10 |

* cited by examiner

*Primary Examiner* — Gary S Hartmann (57) ABSTRACT

An apparatus and method for slowing a vehicle. The method including: disposing a predetermined thickness of collapsible material over a base; disposing a plurality of panels over a top surface of the collapsible material over which the vehicle travels; and selectively either supporting one or more of the plurality of panels or allowing the collapsible material to be compressed under the weight of the vehicle.

11 Claims, 11 Drawing Sheets

DEPLOYABLE COLLAPSIBLE ENGINEERED MATERIAL SYSTEMS FOR RUNWAY SAFETY

BACKGROUND

1. Field of the Invention

The present invention relates generally to emergency apparatus for use with aircraft runways, and more particularly, to collapsible concrete systems for runways.

2. Prior Art

Runway segments are sometimes added to the end of runways that are constructed with a special type of "concrete" that collapses in a more or less controlled manner under the load of an airplane tire, generally referred to as Engineered Material Arresting System (EMAS). Such runway segments have the problem of lack of control because the collapsed EMAS tends to constrain the tire to travel, more or less, in the generated "groove", making it difficult for the plane to maneuver (turn) sideways due to the resistance that the uncrushed "EMAS wall" provides against the tire as it attempts to turn sideways.

In addition, the EMAS material cannot be formed such that it is sufficiently homogeneous to prevent bumpy rides.

In addition, the collapsible EMAS runway breaks up into smaller pieces that can be projected out towards the aircraft, thus creating a safety hazard.

In addition, the collapsible EMAS runway cannot support the weight of the vehicle that is intended to use it in emergency situation. As a result, the collapsible EMAS runway sections cannot be used for regular landing and take-off of aircraft.

In addition, once used by an aircraft to slow its speed and bring it to a stop, the collapsible EMAS runway section becomes essentially unusable. As a result, the related runway may have to be closed for a relatively long periods to allow the repair crew to repair the damaged section of the collapsible EMAS runway section.

SUMMARY

Therefore, there exists a need in the art to overcome the deficiencies of the collapsible EMAS systems of the prior art.

Accordingly, a collapsible material system for slowing a vehicle is provided. The system comprising: a predetermined thickness of collapsible material disposed over a base; a plurality of panels disposed over a top surface of the collapsible material over which the vehicle travels; and a support structure for supporting one or more of the plurality of panels in a first position and for allowing the collapsible material to be compressed under the weight of the vehicle in a second position.

The collapsible material system can further comprise a hinge disposed between adjacent panels of the plurality of panels. The hinge can be disposed to pivot about an axis parallel to a direction of travel of the vehicle. The hinge can be disposed to pivot about an axis perpendicular to a direction of travel of the vehicle. The hinge can further comprises a seal.

The collapsible material system can further comprise a seal disposed between adjacent panels of the plurality of panels.

The collapsible material system can further comprise a transition portion comprising: a predetermined thickness of collapsible transition material disposed over a base; one or more transition panels disposed over a top surface of the collapsible material over which the vehicle travels; and a transition support structure for supporting the one or more panels in a first position and for allowing the collapsible material to be compressed under the weight of the vehicle in a second position; wherein one of the collapsible transition material and the one or more transition panels have a different characteristic from the collapsible material and the plurality of panels, respectively. The different characteristic can be a different orientation of the one or more transition panels. The different characteristic can be a different resistance to compression of the transition material.

The support structure can comprise: a linkage having two or more links, one of the two or more links being connected to the base and the other of the two or more links being connected one or more of the plurality of panels; and one or more locking elements for selectively locking and unlocking the linkage between a locked state corresponding to the first position and an unlocked state corresponding to the second position.

The support structure can comprise: a tubular member connected to one of the base and one or more of the plurality of panels; and one or more members slidingly disposed with the tubular member connected to the other of the base and one or more of the plurality of panels; wherein the one or more member are actuatable between a locked state corresponding to the first position and an unlocked state corresponding to the second position.

Also provided is a collapsible material system for slowing a vehicle. The system comprising: a predetermined thickness of collapsible material disposed over a base; a covering disposed over a top surface of the collapsible material over which the vehicle travels; and a transition portion comprising: a predetermined thickness of collapsible transition material disposed over a base; and a transition covering disposed over a top surface of the collapsible material over which the vehicle travels; and wherein one of the collapsible transition material and the transition covering have a different characteristic from the collapsible material and the covering, respectively.

The different characteristic can be a different orientation of the transition covering. The different characteristic can be a different resistance to compression of the transition material.

Still further provided is a method for slowing a vehicle. The method comprising: disposing a predetermined thickness of collapsible material over a base; disposing a plurality of panels over a top surface of the collapsible material over which the vehicle travels; and selectively either supporting one or more of the plurality of panels or allowing the collapsible material to be compressed under the weight of the vehicle.

The method can further comprise pivoting adjacent panels of the plurality of panels with respect to each other.

The method can further comprise sealing between adjacent panels of the plurality of panels.

The method can further comprise: providing a transition portion comprising: a predetermined thickness of collapsible transition material disposed over a base; one or more transition panels disposed over a top surface of the collapsible material over which the vehicle travels; and a transition support structure for supporting the one or more panels in a first position and for allowing the collapsible material to be compressed under the weight of the vehicle in a second position; and providing one of the collapsible transition material and the one or more transition panels have a different characteristic from the collapsible material and the plurality of panels, respectively.

The providing of the one of the collapsible transition material and the one or more transition panels to have a different characteristic from the collapsible material and the plurality of panels can comprises differing an orientation of the one or more transition panels.

The providing of the one of the collapsible transition material and the one or more transition panels to have a different characteristic from the collapsible material and the plurality of panels can comprises differing a resistance to compression of the transition material.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION

Although this invention is applicable to numerous and various types of roadways and surfaces, it has been found particularly useful in the environment of runways for aircraft. Therefore, without limiting the applicability of the invention to runways for aircraft, the invention will be described in such environment. Those skilled in the art will appreciate that the collapsible EMAS materials based systems of the present invention can be used on roadways for automobiles and trucks and for other wheeled vehicles.

Figure 1:
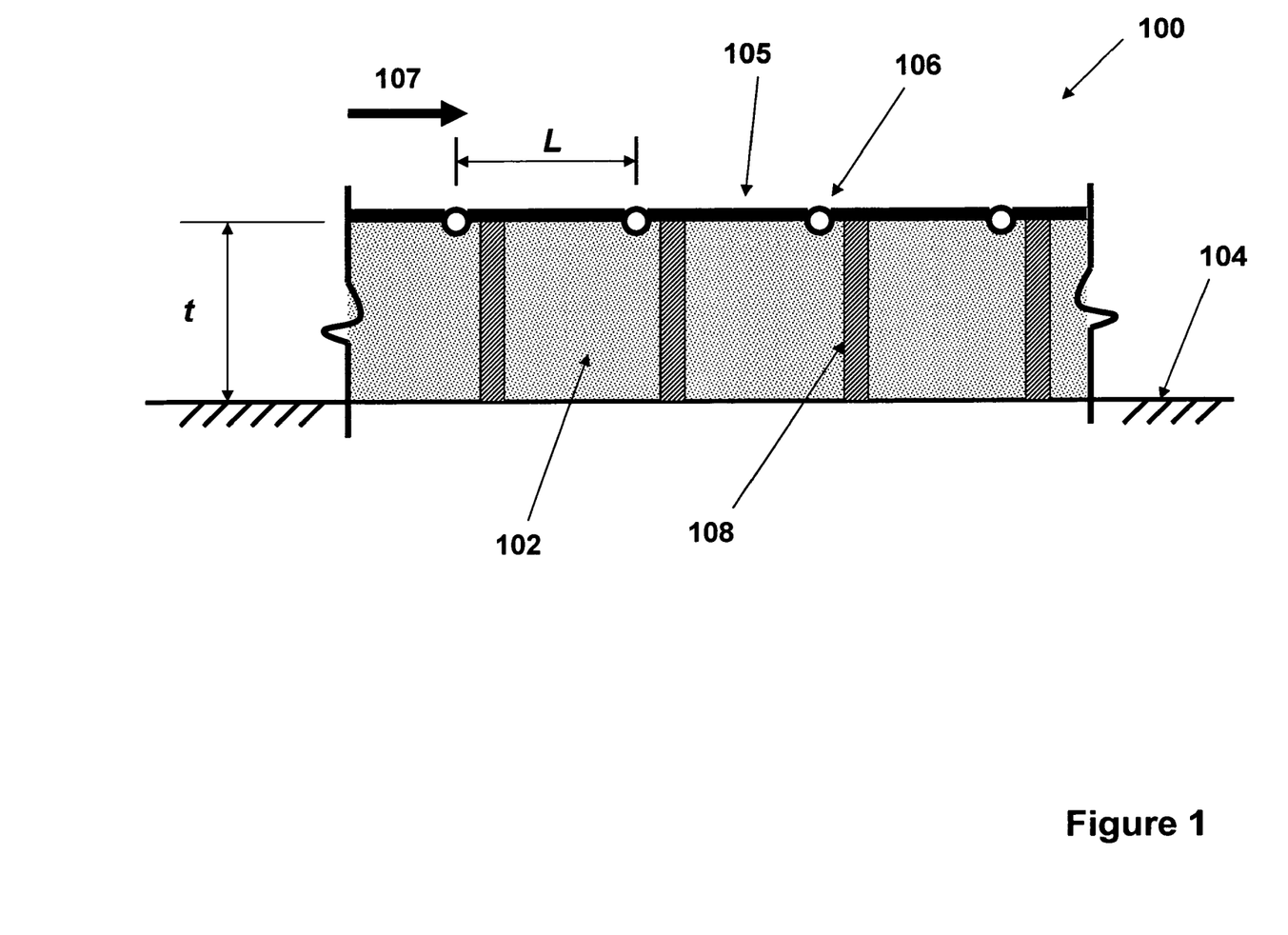
FIG. 1 illustrates an embodiment of a deployable collapsible EMAS materials based system having substantially rigid structures deployed.

Referring now to FIG. 1, there is shown a first embodiment of a deployable collapsible EMAS materials based (hereinafter referred to as collapsible material based) system, generally referred to by reference numeral 100. The collapsible material based system 100 has a predetermined thickness t of collapsible material 102 over a base 104. The fabrication of collapsible material and the proper thickness for the same for different applications is well known in the art. Generally, the collapsible material can be provided in blocks and stacked along the base 104 to cover an appropriate portion of the base. The collapsible material system 102 further has relatively rigid panels 105, which can be separate from each other or preferably interconnected, such as by a hinge 106 to allow relative rotation about axes lateral to the direction of travel 107.

The hinges 106 that connect the panels 105 may be constructed as a narrow "strip" of relatively flexible material (not shown) to join the panels as well as seal the collapsible material 102 and protect it from elements such as rain, snow, etc., and essentially act as living joints. Alternatively, even when mechanical hinges 106 are used, the panels may still be joined together on the top surface with similar narrow strip of relatively flexible material to protect the underlying collapsible material 102. The provision of such narrow strip of relatively flexible material would have the added advantage of providing the collapsible materials based system 100 with a smooth surface.

Figure 2:
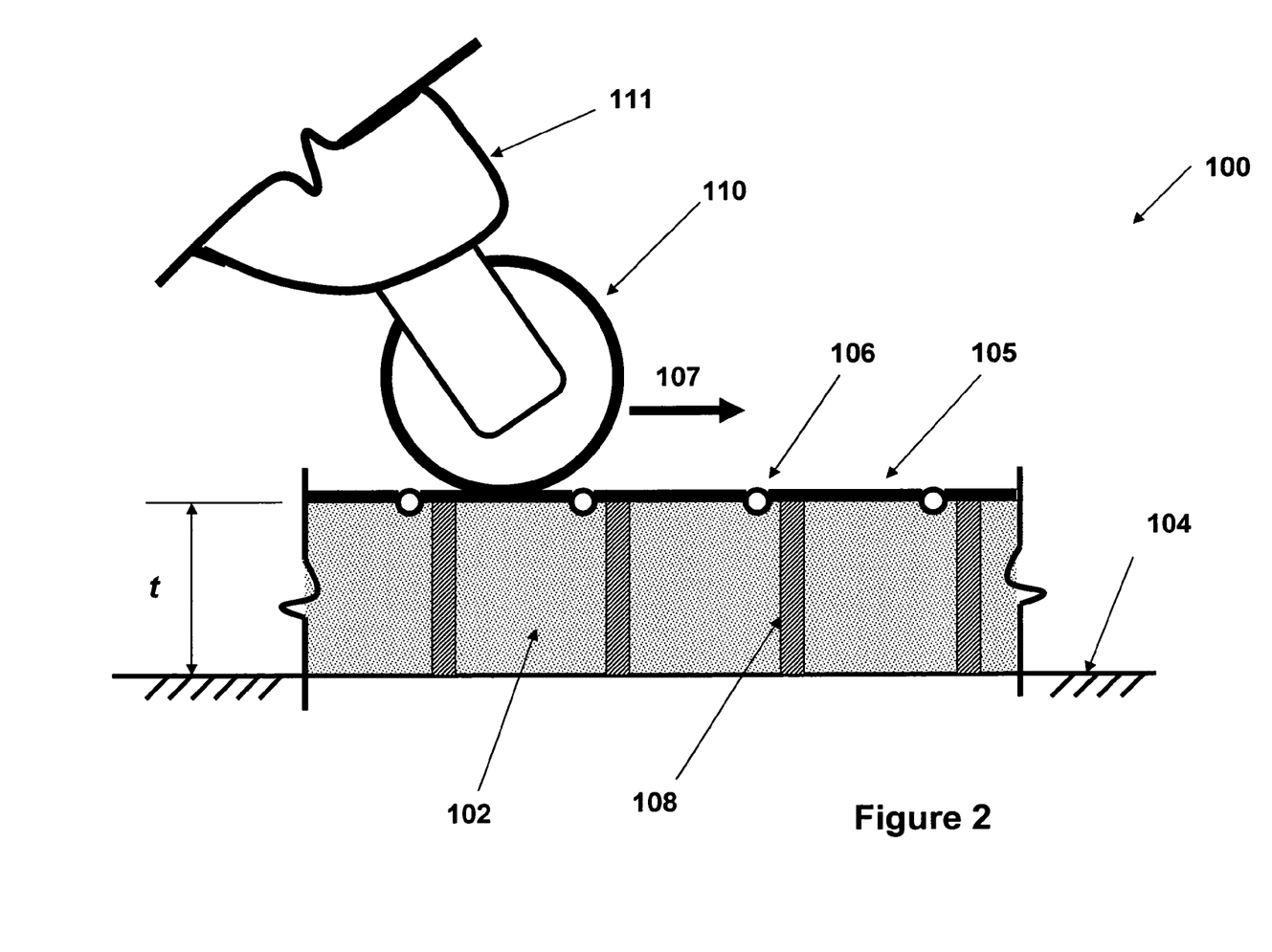
FIG. 2 illustrates the deployable collapsible EMAS materials based system of FIG. 1 in which a wheeled vehicle travels over the same.

The panels 105 are supported by substantially rigid structures 108, such that under the load transmitted by the wheel 110 of a typical vehicle 111 that will use the system 100, as shown in FIG. 2, it would not cause the collapsible material system 102 to be crushed.

Figure 3:
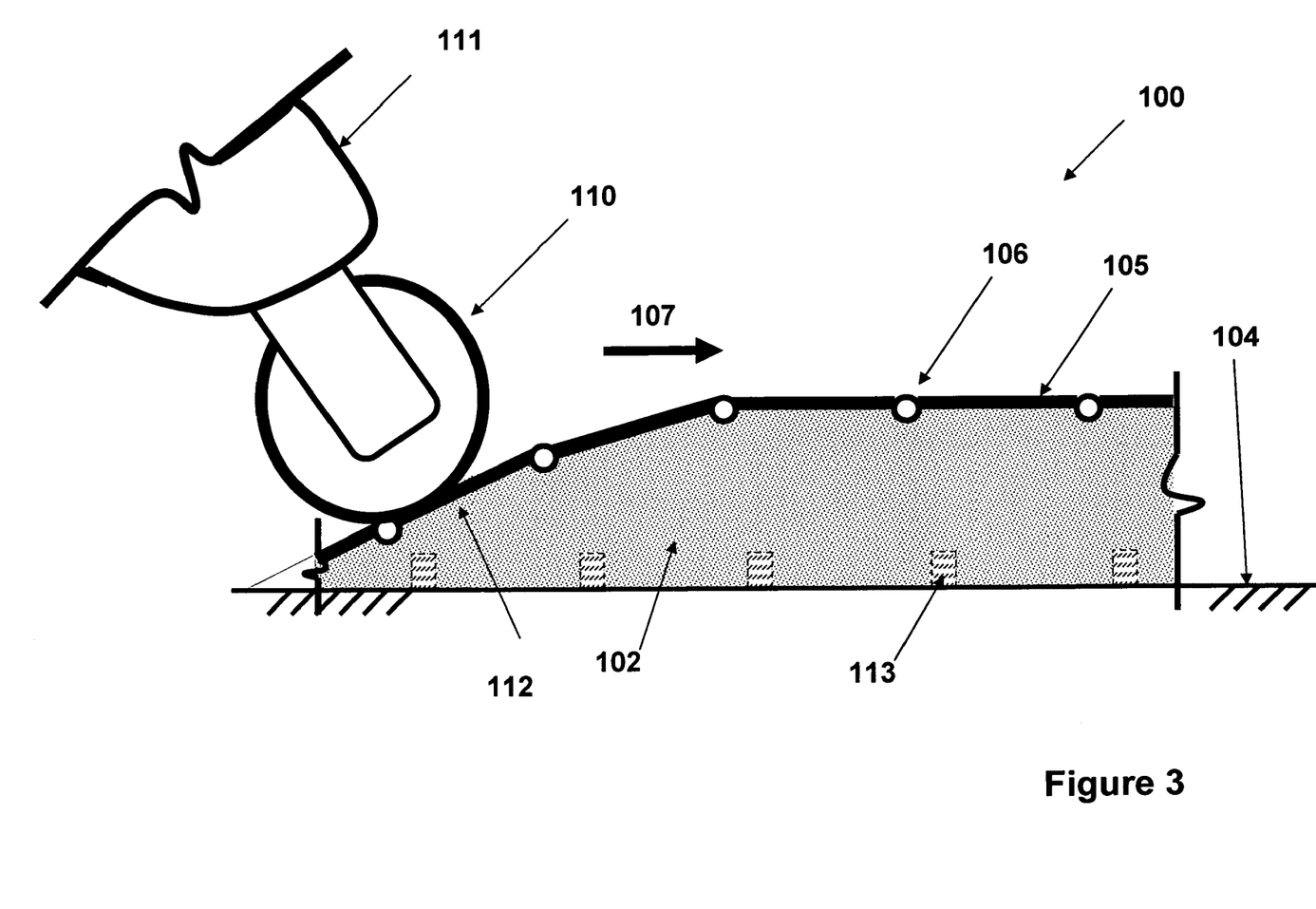
FIG. 3 illustrates the deployable collapsible EMAS materials based system of FIG. 1 with the substantially rigid structures in a retracted (un-deployed state).
Figure 4:
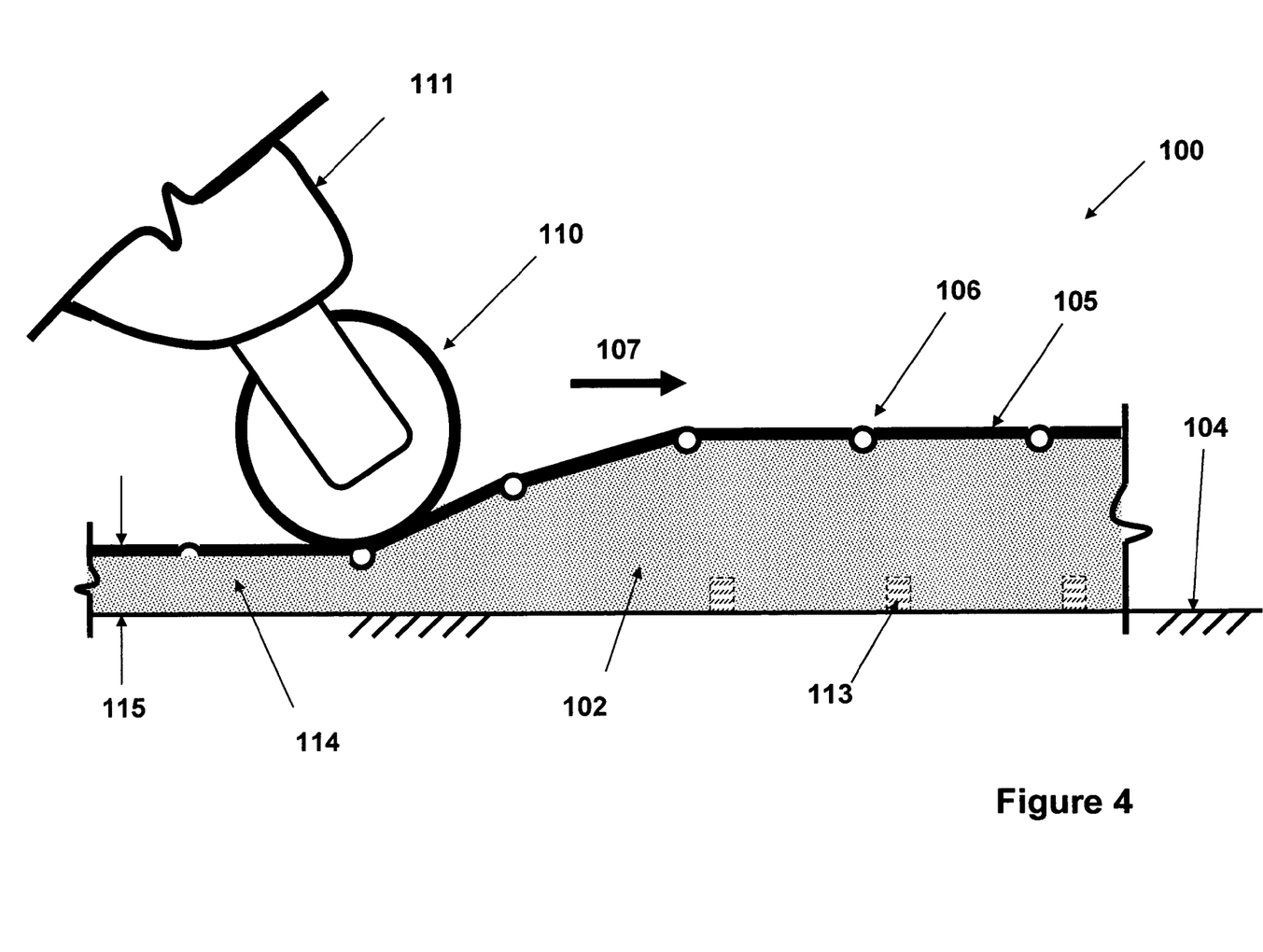
FIG. 4 illustrates the deployable collapsible EMAS materials based system of FIG. 3 where a wheeled vehicle has collapsed a portion thereof.

The support structures 108 are, however, deployable, i.e., in its deployed state they are substantially rigid structures and would support the load exerted by the wheel 110 of the passing vehicle 111 over the supported panels 105. In their un-deployed (retracted) state 113, the supports provide minimal to no resistance to the load exerted by the wheel 110 of the passing vehicle 111 over the "un-supported" panels 105, thereby allowing the said load to press the panels 105 against the collapsible material system 102, FIG. 3. This would then cause the collapsible materials 102 to be crushed as shown in FIG. 4 to certain depth 115 (the fully crushed region is indicated as 114) depending on the load exerted by the wheel 110 of the passing vehicle 111, thereby absorbing the kinetic energy of the passing vehicle and eventually bringing it to a stop or slowing it down as intended by the system user and/or designer. Hereinafter, the aforementioned support structures 108 are referred to as "deployable support structures".

The different methods of providing the aforementioned deployable support structures and their various embodiments are described below.

The length (L), FIG. 1, of the panels 105 is chosen depending on the size of the typical wheel that will use the system (or a range of wheel sizes). The width of the panels 105 (perpendicular to the direction of travel 107) can vary from the width of the typical wheel that will use the system (and perhaps even smaller) to the width of the runway, however, in general, the larger the surface area of the panel 105, the less crushing force is exerted on the collapsible material covered by the panel 105.

The hinges 106 may be provided with certain amount of flexibility and/or play to allow certain amount of relative displacement between the panels 105 in the vertical plane of the schematic cross-sections of FIGS. 1-2. Such relative displacements would accommodate certain amount of rotation and downward motion of one panel 105 relative to the next panel as a typical wheel 110 rolls over panels 105 as shown in FIG. 3. Thus, the hinges 106 would allow the panels 105 to assume a sloped configuration as the vehicle 111 wheel 110 rolls over a panel and to push the leading edge 112 down as shown in FIG. 3.

In general, the side by side panels 105, i.e., the panels positioned side by side in the direction perpendicular to the direction of the travel 107 of the vehicle 111 are preferably connected by flexible elements (not shown) so that the depression of one panel 105 under the weight of the vehicle 111 transmitted by the wheel 110 to the said panel would also exert a force on the sides of the adjacent panels to avoid the creation of abrupt discontinuities.

In the FIGS. 1-4, all the like features are denoted by identical reference numerals.

Figure 5:
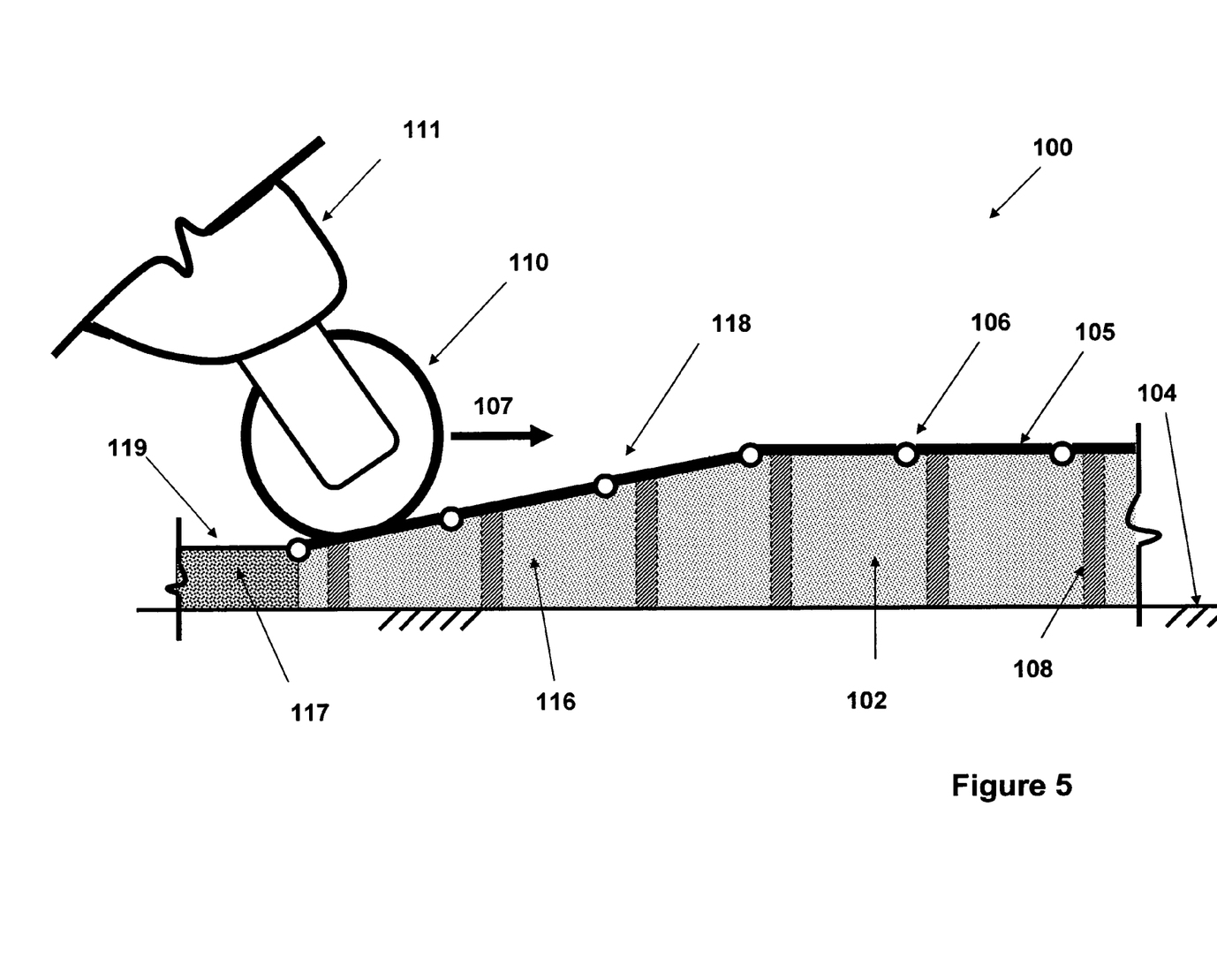
FIG. 5 illustrates a variation of the deployable collapsible EMAS materials based system of FIG. 4 having a transition region.

To make the transition from the regular section of a runway 119 commonly constructed with concrete 117, FIG. 5, to the deployable collapsible materials based system section 100, a slightly sloped transition section 118 is constructed with similar panels 105 that are hinged together with similar hinges 106, and supported by appropriately sized support structures 108. Similar collapsible material 102 that are appropriately sized 116 are similarly used to fill the space between the panels 105 of the transition section 118 and the base 104 as shown in FIG. 5. The transition section 118 would allow the vehicle 111 to begin to decelerate slowly and smoothly to its final deceleration rate as the wheel 110 of the vehicle 111 travels from the regular section of the runway 119 over to the transition section 118 and from there to the deployable collapsible materials based system section 100.

The resulting runway section having the collapsible concrete system 100 will then act very similar to the runway system described in U.S. Pat. No. 6,969,213 entitled "Roadway for Decelerating a vehicle Including an Aircraft," the entire contents of which is incorporated herein by reference. In the present collapsible concrete system, 100, the collapsible concrete 102 and 116 (FIGS. 1-5) is used in place of the support and control elements disclosed in U.S. Pat. No. 6,969,213. The difference is that when substantially rigid support structures 108 (FIGS. 1, 2 and 5) are in their retracted state 113 (FIGS. 3-4), the kinetic energy of the vehicle is used to crush the collapsible concrete (collapsible EMAS materials) rather than being stored in springs or absorbed by dampers or brake elements. Thus, as shown in FIG. 5, as a wheel 110 of the vehicle 111 enters the collapsible EMAS materials system 100, the wheel 110 first enters the transition section 118 from the regular runway section 119 as shown in FIG. 5. The load transmitted by the wheel 110 will then begin to press the panels 105 of the transition section 118, forcing the panels to crush the collapsible materials 116 under the transition section 118. The wheel will then reach the level section of the collapsible EMAS materials system 100, and keep on depressing the panels 105 down and crush the collapsible materials 102 to certain height 1115, FIG. 4, which is dependent on the level of load transmitted by the wheel 110 of the vehicle 111.

In addition to the panels 105 preventing debris from being thrown, another advantage of using such panels 105 over collapsible EMAS materials 102 (116) is that the vehicle travels much smoother since it would average out the strength of the collapsible EMAS materials system 102 (116), the homogeneity of which is hard to control.

Still another advantage of the collapsible EMAS materials system 100 is that there is no resulting loss of control of the vehicle 111 as it travels over the panels 105 rather than in grooves generated by the sinking wheel 110 in the collapsible EMAS materials 102 (116) in the absence of the panels 105.

Still another advantage of the collapsible materials system 100 is that with the substantially rigid support structures 108 deployed (FIGS. 1, 2 and 5), the system 100 is substantially rigid and the load transmitted by the wheel 110 of the vehicle 111 will be carried substantially by the substantially rigid support structure 108. The section 100 would therefore function as a regular section of a runway and add to the total length of the regular runway, a feature which is highly desirable for all runways. However, when an emergency situation is encountered, the substantially rigid support structures 108 are retracted to their un-deployed (retracted) state, FIGS. 2-3, and the vehicle 110 traveling in the direction 107 is decelerated safely to a stop.

Still another advantage of the collapsible EMAS materials system 100 is that following an emergency use of the section of the runway to decelerate a vehicle, for example a runaway aircraft, the substantially rigid support structures 108 may again be deployed and the section of the runway used for ordinary landing while the damaged collapsible EMAS materials (102 and 116, FIG. 5) sections are ready to be replaced. As a result, the runway does not have to be closed while the collapsible EMAS materials (102 and 116, FIG. 5) sections are being made. In addition, the collapsible EMAS materials system 100 is still mostly effective since the chances of a second runaway vehicle to follow exactly the path of a previous runaway vehicle is very small.

Figure 6:
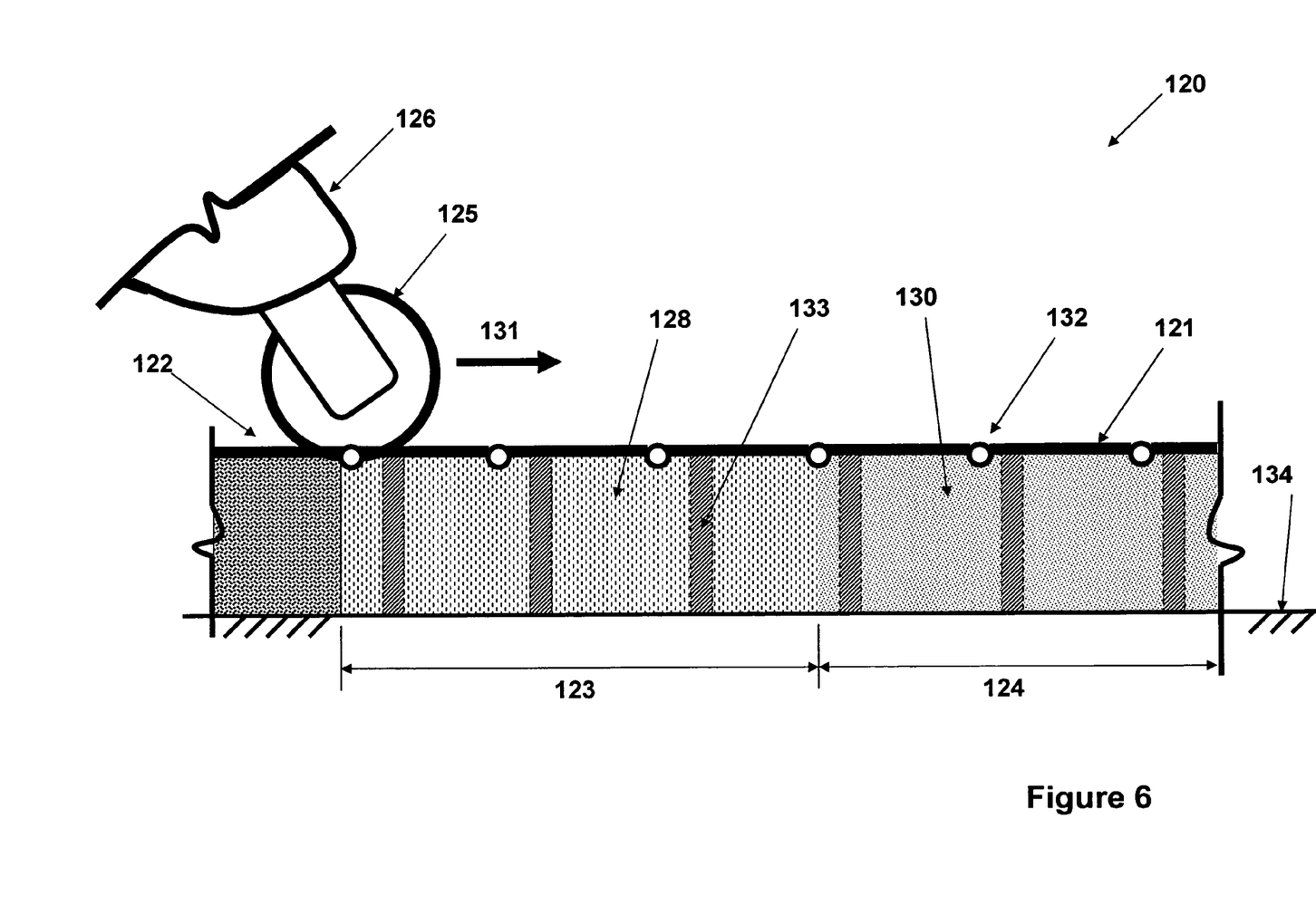
FIG. 6 illustrates another embodiment of a deployable collapsible EMAS materials based system with the substantially rigid structures in a retracted (un-deployed state).

In another embodiment, the schematics of which is shown in FIG. 6, a collapsible materials based system 120 is constructed such that the panels 121 connected together with hinges 132 are flush with the regular runway section 122, both for the transition section 123 panels and the main section 124 panels. In their deployed state, the aforementioned substantially rigid support structures 133 support the panels 121, such that under the load transmitted by the wheel 125 of a typical vehicle 126 that will use the system 120, as shown in FIG. 6, it would not cause the collapsible materials 128 and 130 to be crushed. The collapsible EMAS materials 128 and 130 of both sections 123 and 123 and the substantially rigid support structures 133 are supported by a similar base (foundation) structure 134.

Figure 7:
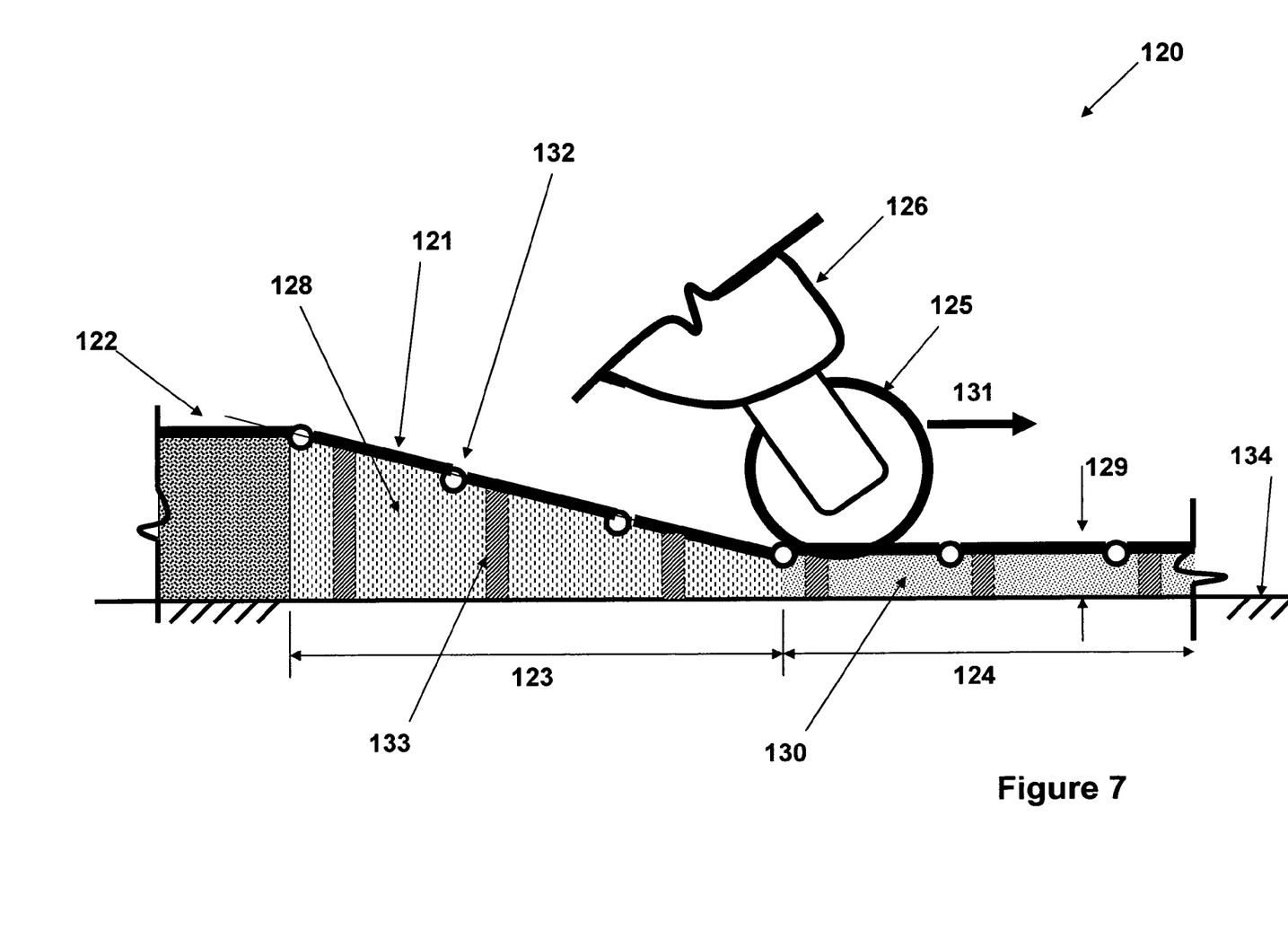
FIG. 7 illustrates the deployable collapsible EMAS materials based system of FIG. 7 having a transition region.

However, the transition from the regular runway section 122 to the collapsible materials based system 120 is highly desirable to be smooth for the wheel 125 of the vehicle 126, i.e., the wheel 125 of the vehicle 126 is desired to slowly increase its vertical (downward) travel (i.e., crushing depth of 127 of the collapsible EMAS materials 128) as it moves from the regular runway section 122 to over the panels 121 to its nominal depth 129, FIG. 7. To this end, the collapsible EMAS materials 128 following the regular runway section 122 in the transition section 123 is made out of stronger collapsible EMAS materials, i.e., collapsible EMAS materials that crush less under the same load, and then become progressively weaker to the nominal strength of the collapsible EMAS materials 130 of the remaining section 124 of the collapsible EMAS materials system 120. As a result, as the wheel 125 of the vehicle 126 traveling in the direction 131 enters the section of the runway constructed with the collapsible materials based system 120, the first few panels 121 positioned along the aforementioned transition section 123 are depressed due to the crushing of the stronger collapsible EMAS materials 128 continuously more to bring the wheel 125 smoothly to its nominal depth 129 over the remaining section 124 of the collapsible materials system 120 as shown in FIG. 7.

The support structures (108 in FIGS. 1-2 and 5 and 133 in FIGS. 6-7), while supporting the vehicle load over the substantially rigid panels (105 in FIGS. 1-5 and 121 in FIGS. 6 and 7), are constructed to prevent the collapsible materials (102 in FIGS. 1-5 and 128 and 130 in FIGS. 6 and 7) from being crushed under the weight of the vehicle (111 in FIGS. 2-5 and 126 in FIGS. 6 and 7) as transmitted by the vehicle tires (110 in FIGS. 2-5 and 125 in FIGS. 6 and 7). The support structures 108 and 133, however, are capable of being released, i.e., being made incapable of supporting the aforementioned vehicle load, thereby allowing crushing of the collapsible materials (102, 128 and 130) under the vehicle load.

The support structure releasing action may be initiated manually, for example by the flight control personnel or by the aircraft crew, or may be initiated automatically when sensors measuring the speed of the landing aircraft determine that the aircraft is moving too fast and may run past the runway. The automatic means of release mechanism initiation may also be onboard the aircraft and initiate the release directly or by communicating with a runway station. The support structures 108 and 133 and their release mechanisms may be constructed in a varieties of ways, some of which are described in the following embodiments.

In general, the mechanisms for the support structures 108 and 133 can be configured to either retract out of the direction of collapsible material (102, 128 and 130) crushing, or can be configured to move with the panels (105 and 121) with minimal resistance. Alternatively, while moving with the panels 105 and 121, the support structures may also provide certain amount of (braking-like) resistance, thereby absorbing a portion of the kinetic energy of the vehicle.

In one embodiment, the support structures 108 and 133 are designed as linkage mechanisms with a releasable locking element, which when locked, would transform the mechanism to a (substantially rigid) structure (no degree-of-freedom for motion), supporting the vehicle load on the panels 105 and 121 as previously described. However, once the locking mechanism is released, the linkage mechanism is essentially free to "collapse", thereby allowing the panels 105 and 121 to crush the underlying collapsible materials (102, 128 and 130).

In one embodiment, the linkage mechanism types used for the construction of the present support structures 108 and/or 133 have at least two degrees-of-freedom in motion to allow arbitrary motion of the panels 105 and 121 relative to the base foundation (104 in FIGS. 1-5 and 134 in FIGS. 6-7). In general, fewer degrees-of-freedom in motion is preferable since it would require fewer locking elements to transform the mechanism into a substantially rigid structure (in general, one such locking mechanism is required for each degree-of-freedom of the linkage mechanism to transform the mechanism into a substantially rigid structure).

Figure 8:
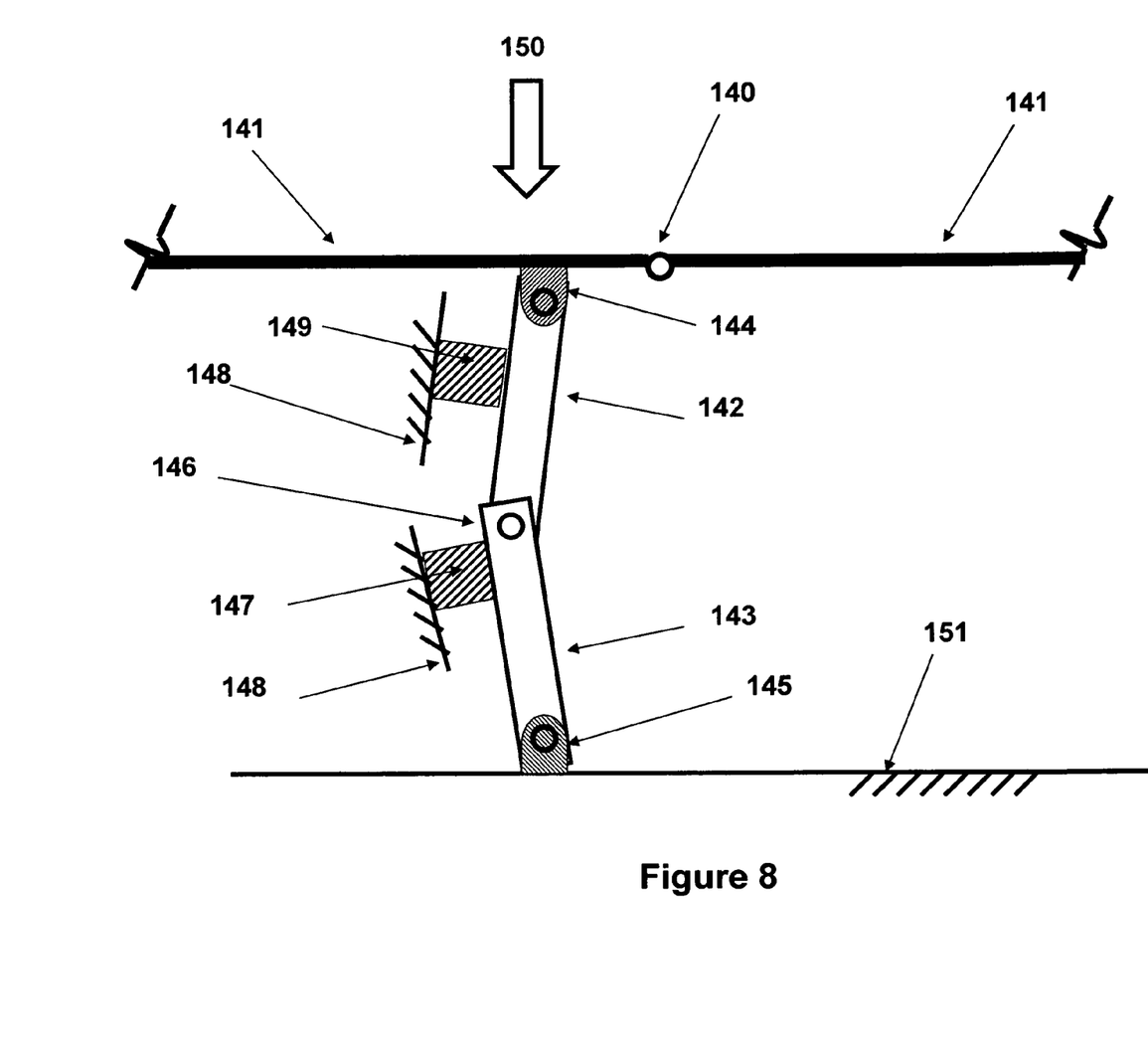
FIG. 8 illustrates an embodiment of a substantially rigid structure.

One such degree-of-freedom linkage mechanism embodiment for the construction of the present support structures 108 and/or 133 is shown in the schematic drawing of FIG. 8. This mechanism is constructed with two links 142 and 143, which are connected together with a hinge 146. The link 142 is hinged to the panel 141 through the attachment support 144. The link 143 is in turn attached to the runway foundation 151 through the support 145. The panels 141 are shown to be attached to each other by hinges 140. The locking elements 147 and 149 are provided to prevent rotary motion of the links 143 and 142, respectively, relative to the runway foundation, portions of which are shown as 148. It is noted that in the schematic of FIG. 8 and for the sake of simplicity the locking elements 147 and 149 are shown only on one side the links 143 and 142, but in an actual device the locking elements are intended to provide locking elements positioned on both sides of the links (e.g., by providing U shaped elements instead of blocks 147 and 149 as shown in FIG. 8) to restrict the links 143 and 142 from undergoing any rotational motions. When the locking elements 147 and 149 are preventing the links 143 and 142 from rotating, the two links function as a structure, i.e., function as substantially rigid support structures 108 and 133, thereby supporting the load 150 exerted by the vehicle wheel (110 and 125 in FIGS. 1-7) on the panels 141, thereby preventing the panel to be pushed down and crush the collapsible materials 102 or 128 and/or 130 (not shown in FIG. 8). When a vehicle traveling over the runway section needs to be slowed down, the locking elements 147 and 149 are withdrawn, thereby preventing the links 143 and 142 (the linkage mechanism) to provide a substantial resistance to the applied load 150, thereby allowing the panels 141 to crush the collapsible materials 102 or 128 and/or 130, absorbing part of the kinetic energy of the vehicle and therefore slowing the vehicle down.

The links 149 and 147 (linkage mechanism) may be provided with spring elements (not shown) to bias them into their collapsed position. The linkage mechanism may also be provided with braking elements (frictional or viscous damping type) to absorb parts of the kinetic energy of the passing vehicle as the weight of vehicle pushes the panels 141 down to crush the collapsible materials 102 or 128 and/or 130.

In another embodiment of the present invention, the linkage mechanism type used for the construction of the present support structures 108 and/or 133 has only one degrees-of-freedom in motion; thereby would only allow the panels 105 and 121 to undergo a prescribed motion relative to the runway foundation (104 and 134). The prescribed motion is preferably the actual motion pattern of the panels 105 and 121 as the vehicle load is applied to the surface of the panels and travel along its length, causing the collapsible materials 102 or 128 and/or 130 to crush. However, since this pattern of motion for the panels 105 and 121 is different for different vehicles and their speed, one compromise would be to provide linkage mechanisms that allow only vertical motion, and attach them to the panels by a, preferably, spherical joint that would allow for rotational motion of the panels 105 and 121 about axes parallel to the plane of the foundation, i.e., usually the horizontal plane. The rotation of the panels 105 and 121 about the vertical axis is prevented since more than one support structure 108 and/or 133 is used for each said panels.

Figure 9:
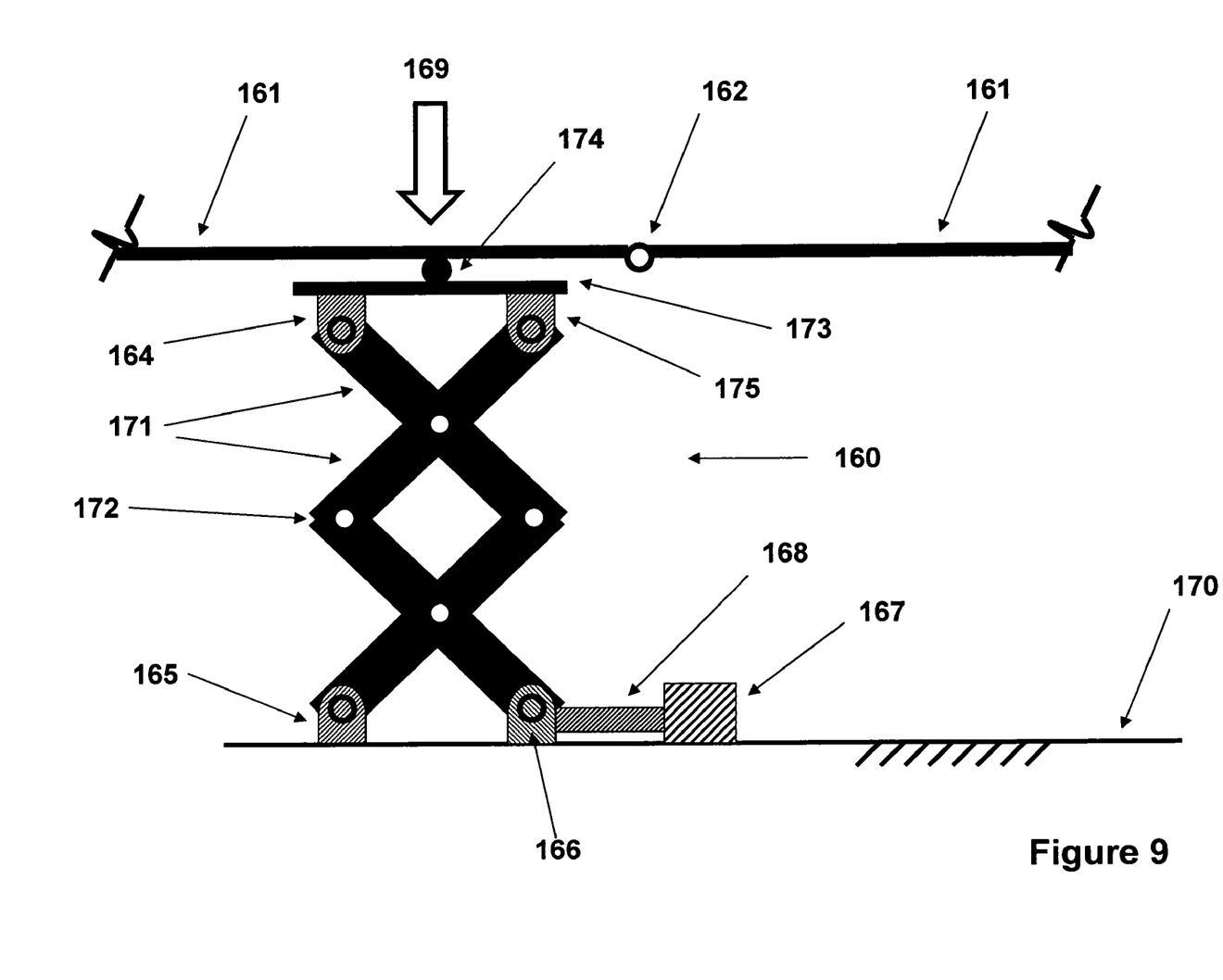
FIG. 9 illustrates another embodiment of a substantially rigid structure.

One such an embodiment is designed as a "scissor" type of linkage mechanism 160 shown in the schematic drawing of FIG. 9. The scissor mechanism is constructed with a series of pairs of links 171 that are joined together as shown in FIG. 9 with hinges 172. On the foundation 170 side, one of the links 171 is hinged to the support 165, which is in turn fixed to the foundation 170. The other link 171 of the scissor mechanism 160 is hinged to the support 166. The support 166 rests over the surface of the foundation 170 and is free to translate along the line connecting the supports 165 and 166. Similarly on the panel 161 side, one of the links 171 is hinged to the support 164, which is fixed to the plate 173. The other link 171 is then hinged to the support 175, which is free to translate along the line connecting the supports 164 and 175. The panel 161 is then supported by the scissor type mechanism via the ball joint 174. The panels 161 are attached together as previously described by the hinge joints 162. The ball joint 174 may be a living joint.

In the schematic drawing of FIG. 9, the translation of the support 166 over the surface of the foundation 170 away from the fixed support 165 is prevented by the locking element 168 which is positioned between the support 166 and the stop 167, which is fixed to the foundation 170. When the locking element 168 is positioned as shown in FIG. 9 between the support 166 and the stop 167, then the scissor mechanism 160 is substantially rigid and the top plate 173 can support the vehicle load 169 that is applied to the panel 161 as the vehicle travels over the said panel. However, when the locking element 168 is pulled away from its aforementioned locking position shown in FIG. 1, then the support 166 is free to translate away from the fixed support 165, thereby allowing the scissor mechanism to collapse, thereby allowing the panel 161 to crush the collapsible materials 102 or 128 and/or 130 as the vehicle travels over the panel 161 and applies the load 169 to the said panel.

As described for the mechanism of FIG. 8, the links 171 (linkage mechanism) may be provided with spring elements (not shown) to bias them into their collapsed position. The linkage mechanism may also be provided with braking elements (frictional or viscous damping type) to absorb a portion of the kinetic energy of the passing vehicle as the weight of the vehicle pushes the panels 161 down to crush the collapsible materials 102 or 128 and/or 130 (not shown).

Figure 10:
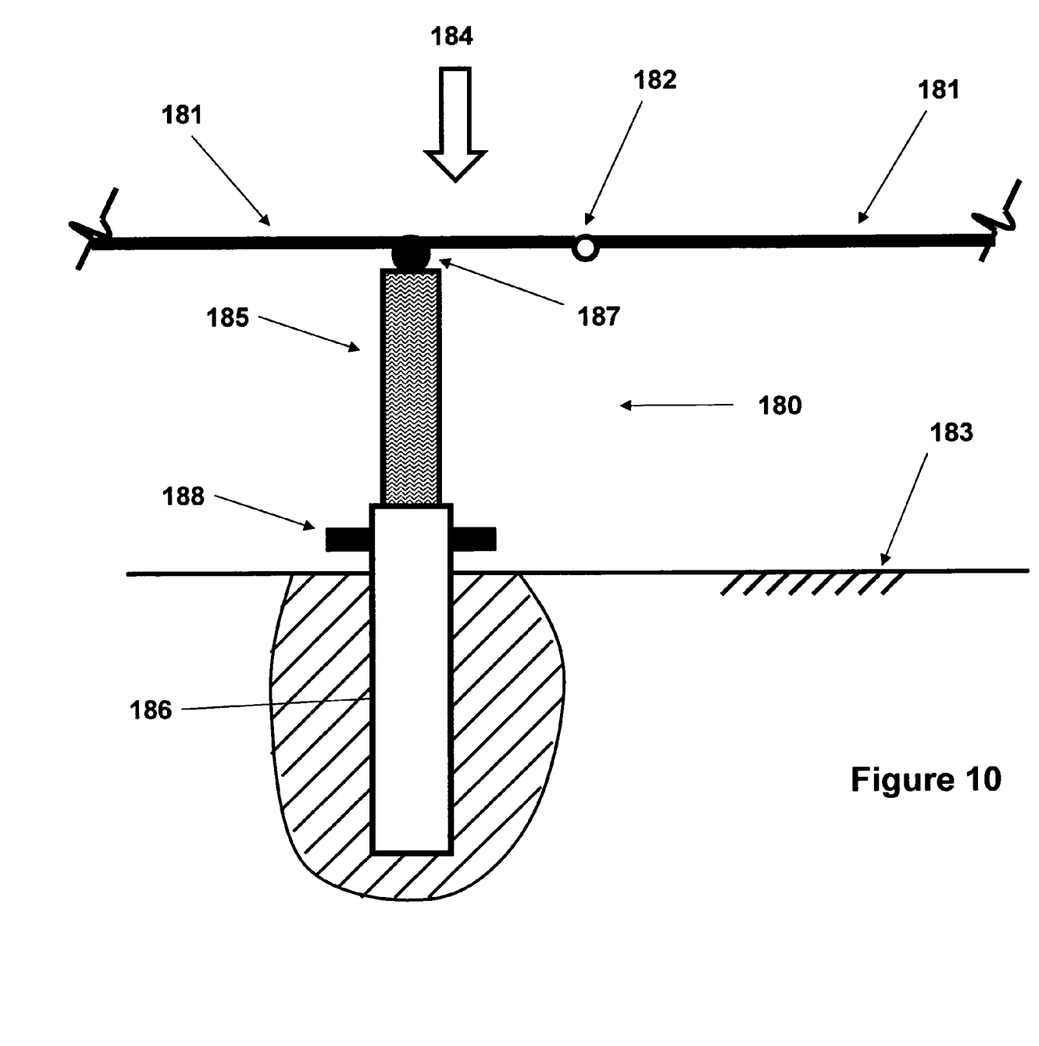
FIG. 10 illustrates yet another embodiment of a substantially rigid structure.

In yet another embodiment, the support structures 108 and/or 133 is constructed as a one degree-of-freedom telescopic column type of mechanism 180 shown in the schematic drawing of FIG. 10. Here, the mechanism 180 is shown to consist of a moving section 185 (can be cylindrical or other shapes), which could travel down inside the second tubular section 186. The section 186 is fixed to the foundation 183, and is preferably buried substantially inside the foundation for increased support and to allow the section 185 to move down a sufficient amount for the proper operation of the present system. The locking element 188 provides the means to lock the section 185 of the telescopic mechanism 180 up in the position shown in FIG. 10. In this position, the telescopic mechanism functions as a support structure support structures 108 and/or 133, and support the load 184 applied by the tire of the vehicle passing over the panel 181 via the ball joint 187. The panels 181 are attached together as previously described by the hinge joints 182. The ball joint 187 may be a living joint.

When the locking element 187 is pulled out of the telescopic (column) mechanism 180, the section 185 is free to retract into the section 186, thereby allowing the panel 181 to crush the collapsible materials 102 or 128 and/or 130 (not shown) as the vehicle travels over the panel 181 and applies the load 184 to the said panel.

As described for the mechanisms of FIGS. 8 and 9, spring elements (not shown) may be used to bias the translation of the section 185 inside the section 186 of the telescopic mechanism 180 to bias the mechanism into its collapsed position. The telescopic mechanism may also be provided with braking elements (frictional or viscous damping type) to absorb parts of the kinetic energy of the passing vehicle as the weight of vehicle pushes the panels 181 down to crush the collapsible materials 102 or 128 and/or 130 (not shown).

Such telescopic column type mechanisms may also be constructed with more than one telescopic section to minimize the length of the buried section 186. However, since each section has to be provided with a separate locking element 188, the resulting support structure will have more components and more locking elements to be removed when the runway section is intended to be used to slow the passing vehicle.

Figure 11:
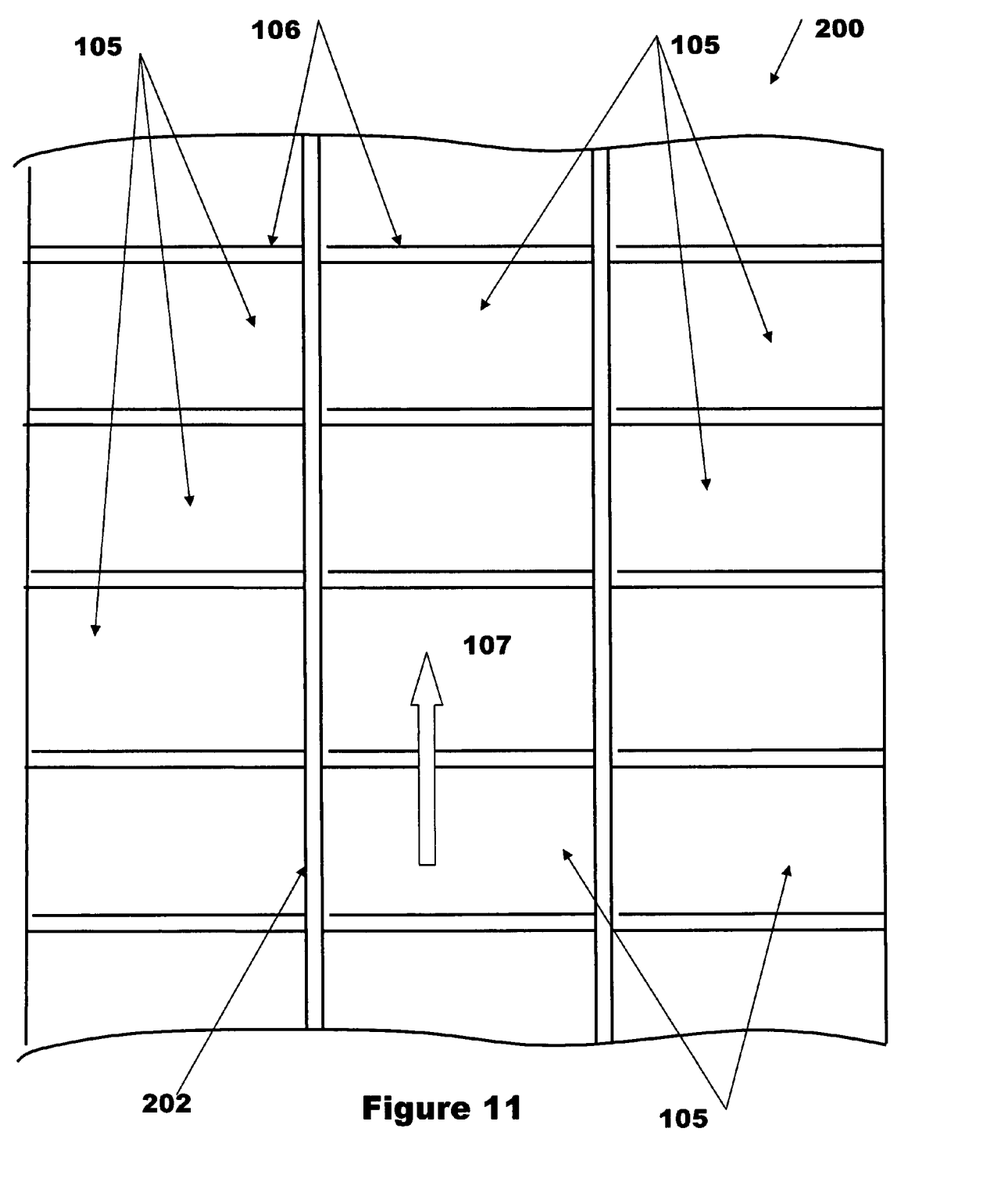
FIG. 11 illustrates a top view of another embodiment of a deployable collapsible EMAS materials based system.

Referring now to FIG. 1, there is shown a top view of another embodiment of a collapsible material based system 200. In the embodiment of FIG. 11, in addition to the panels 105 being pivotal about hinges (or flexures) 106 which pivot about an axis perpendicular to the direction of travel 107, the panels 105 can also be pivotal about hinges (or flexures 202) which pivot about an axis parallel to the direction of travel so as to arrest any component of motion of the aircraft in the sideways direction which would otherwise cause the aircraft to leave the side of the runway. In such an embodiment, an appropriate number of support structures 108 are needed to support each panel 105, such as three or more of such support structures 108 per panel 105. The side-to-side (perpendicular to the direction of travel 107) spacing of the hinges 202 can be more, less or the same as the lengthwise spacing between hinges 106. However, it is preferred that the side-to-side spacing between hinges 202 is greater than the lengthwise spacing between hinges 106 such that the panels are wider in the side-to-side direction than they are in the lengthwise (direction of travel 107) direction.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A collapsible material system for slowing a vehicle, the system comprising:
   a predetermined thickness of collapsible material disposed over a base;
   a plurality of panels disposed over a top surface of the collapsible material over which the vehicle travels; and
   a support structure for supporting one or more of the plurality of panels in a first position and for allowing the collapsible material to be compressed under the weight of the vehicle in a second position.

2. The collapsible material system of claim 1, further comprising a hinge disposed between adjacent panels of the plurality of panels.

3. The collapsible material system of claim 2, wherein the hinge is disposed to pivot about an axis parallel to a direction of travel of the vehicle.

4. The collapsible material system of claim 2, wherein the hinge is disposed to pivot about an axis perpendicular to a direction of travel of the vehicle.

5. The collapsible material system of claim 2, wherein the hinge further comprises a seal.

6. The collapsible material system of claim 1, further comprising a seal disposed between adjacent panels of the plurality of panels.

7. The collapsible material system of claim 1, further comprising a transition portion comprising:
   a predetermined thickness of collapsible transition material disposed over a base;
   one or more transition panels disposed over a top surface of the collapsible material over which the vehicle travels; and
   a transition support structure for supporting the one or more panels in a first position and for allowing the collapsible material to be compressed under the weight of the vehicle in a second position;
   wherein one of the collapsible transition material and the one or more transition panels have a different characteristic from the collapsible material and the plurality of panels, respectively.

8. The collapsible material system of claim 7, wherein the different characteristic is a different orientation of the one or more transition panels.

9. The collapsible material system of claim 7, wherein the different characteristic is a different resistance to compression of the transition material.

10. The collapsible material system of claim 1, wherein the support structure comprises:
    a linkage having two or more links, one of the two or more links being connected to the base and the other of the two or more links being connected one or more of the plurality of panels; and
    one or more locking elements for selectively locking and unlocking the linkage between a locked state corresponding to the first position and an unlocked state corresponding to the second position.

11. The collapsible material system of claim 1, wherein the support structure comprises:

a tubular member connected to one of the base and one or more of the plurality of panels; and one or more members slidingly disposed with the tubular member connected to the other of the base and one or more of the plurality of panels;

wherein the one or more member are actuatable between a locked state corresponding to the first position and an unlocked state corresponding to the second position.

* * * * *